(12) United States Patent
Vetters et al.

(10) Patent No.: US 10,577,951 B2
(45) Date of Patent: Mar. 3, 2020

(54) GAS TURBINE ENGINE WITH DOVETAIL CONNECTION HAVING CONTOURED ROOT

(71) Applicants: Rolls-Royce North American Technologies, Inc., Indianapolis, IN (US); Rolls-Royce High Temperature Composites Inc., Cypress, CA (US)

(72) Inventors: Daniel K. Vetters, Indianapolis, IN (US); Ted J. Freeman, Danville, IN (US); Andrew J. Lazur, Huntington Beach, CA (US); Robert J. Shinavski, Mission Viejo, CA (US); Wayne S. Steffier, Huntington Beach, CA (US)

(73) Assignees: Rolls-Royce North American Technologies Inc., Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 289 days.

(21) Appl. No.: 15/365,498

(22) Filed: Nov. 30, 2016

(65) Prior Publication Data
US 2018/0149026 A1    May 31, 2018

(51) Int. Cl.
*F01D 5/30* (2006.01)
*F01D 25/24* (2006.01)
(Continued)

(52) U.S. Cl.
CPC ........... *F01D 5/3015* (2013.01); *F01D 5/282* (2013.01); *F01D 5/3007* (2013.01);
(Continued)

(58) Field of Classification Search
CPC .... F01D 5/3015; F01D 5/3007; F01D 25/246; F01D 2240/11; F01D 2300/6033; F01D 2230/237; F01D 2220/32; F01D 2250/185; F01D 2250/71; F01D 5/282; F02C 3/04; Y02T 50/672
See application file for complete search history.

(56) References Cited

U.S. PATENT DOCUMENTS

| 875,647 A | 12/1907 | Bassett et al. |
| 2,317,338 A | 4/1943 | Rydmark et al. |

(Continued)

FOREIGN PATENT DOCUMENTS

| EP | 2374999 A2 | 10/2011 |
| FR | 2608674 A1 | 6/1988 |
| WO | 2014/163674 A1 | 10/2014 |

OTHER PUBLICATIONS

Corman, Gregory S., Luthra, Krishan L.: Melt Infiltrated Ceramic Composites (Hipercomp) for Gas Turbine Engine Applications, Continuous Fiber Ceramic Composites Program Phase II Final Report for the Period of May 1994-Sep. 2005, 507 pages.

(Continued)

*Primary Examiner* — David Hamaoui
(74) *Attorney, Agent, or Firm* — Barnes & Thornburg LLP (57) ABSTRACT

A gas turbine engine includes a turbine having turbine blades and a shroud having a blade track for positioning radially outside of the blades. At least one of the blades and the blade track are secured in place using a dovetail connection between a dovetail receiver and a dovetail assembly formed to include a contoured root.

28 Claims, 5 Drawing Sheets

(51) Int. Cl.
*F01D 5/28* (2006.01)
*F02C 3/04* (2006.01)

(52) U.S. Cl.
CPC .............. *F01D 25/246* (2013.01); *F02C 3/04* (2013.01); *F05D 2220/32* (2013.01); *F05D 2230/237* (2013.01); *F05D 2240/11* (2013.01); *F05D 2250/185* (2013.01); *F05D 2250/71* (2013.01); *F05D 2300/6033* (2013.01); *Y02T 50/672* (2013.01)

(56) References Cited

U.S. PATENT DOCUMENTS

| | | | |
|---|---|---|---|
| 2,807,435 A * | 9/1957 | Howlett | F01D 9/042 164/108 |
| 2,821,357 A | 1/1958 | Schorner et al. | |
| 3,045,968 A * | 7/1962 | Willis | F01D 5/3007 416/216 |
| 5,368,444 A | 11/1994 | Anderson | |
| 5,405,245 A | 4/1995 | Cornelius et al. | |
| 6,250,883 B1 | 6/2001 | Robinson et al. | |
| 6,331,217 B1 * | 12/2001 | Burke | B23H 9/10 148/522 |
| 6,702,550 B2 | 3/2004 | Darkins, Jr. et al. | |
| 6,733,235 B2 | 5/2004 | Alford et al. | |
| 7,052,235 B2 | 5/2006 | Alford et al. | |
| 7,278,820 B2 | 10/2007 | Keller | |
| 7,351,036 B2 * | 4/2008 | Liang | F01D 5/186 416/97 R |
| 7,503,751 B2 * | 3/2009 | Arrieta | F01D 5/3007 29/889.21 |
| 8,061,977 B2 | 11/2011 | Keller et al. | |
| 8,221,083 B2 * | 7/2012 | Alvanos | F01D 5/3007 416/219 R |
| 8,231,354 B2 * | 7/2012 | Campbell | B23P 15/04 416/193 A |
| 8,347,636 B2 | 1/2013 | Butkiewicz et al. | |
| 8,727,730 B2 * | 5/2014 | Liotta | F01D 5/282 416/193 A |
| 8,951,016 B2 * | 2/2015 | Ahmad | F01D 5/3007 416/219 R |
| 9,963,979 B2 * | 5/2018 | Freeman | F01D 5/284 |
| 10,060,277 B2 * | 8/2018 | Engel | F01D 5/3084 |
| 2011/0142639 A1 * | 6/2011 | Campbell | F01D 5/081 416/95 |
| 2012/0308391 A1 | 12/2012 | Garin et al. | |
| 2013/0011271 A1 * | 1/2013 | Shi | F01D 5/28 416/230 |
| 2013/0064668 A1 | 3/2013 | Paige, II et al. | |
| 2013/0136582 A1 | 5/2013 | Mizokami et al. | |
| 2013/0243601 A1 | 9/2013 | Floyd | |
| 2013/0247586 A1 | 9/2013 | Luczak | |
| 2013/0323073 A1 | 12/2013 | McCaffrey et al. | |
| 2014/0030072 A1 | 1/2014 | Hillier et al. | |
| 2015/0003958 A1 | 1/2015 | Uskert et al. | |
| 2015/0044049 A1 | 2/2015 | Lamusga et al. | |
| 2016/0201483 A1 * | 7/2016 | Engel | F01D 5/282 416/220 R |
| 2017/0002674 A1 | 1/2017 | Vetters et al. | |

OTHER PUBLICATIONS

Corman, Gregory S., Luthra, Krishan L.: Melt Infiltrated Ceramic Matrix Composites for Shrouds and Combustor Liners of Advanced Industrial Gas Turbines, Advance Materials for Advanced Industrial Gas Turbines (AMAIGT) Program Final Report for the Period Jul. 1, 2000-Sep. 30, 2010, 511 pages.

Extended EP Search Report completed on Mar. 21, 2018 and issued in connection with EP Patent Appln. No. 17199233.2.

European Office Action, dated Jul. 31, 2019 in connection with European Application No. 117199233.2, 4 pages.

* cited by examiner

GAS TURBINE ENGINE WITH DOVETAIL CONNECTION HAVING CONTOURED ROOT

BACKGROUND

The present disclosure relates generally to gas turbine engines, and more specifically to connection of components used in gas turbine engines.

Gas turbine engines are used to power aircraft, watercraft, electric generators, among other things. Gas turbine engines typically include a compressor, a combustor, and a turbine. The compressor compresses air drawn into the engine and delivers high pressure air to the combustor. In the combustor, a mixture of fuel with the high pressure air is combusted. Products of the combustion reaction in the combustor are directed into the turbine where work is extracted to drive the compressor and, sometimes, an output shaft, fan, and/or propeller.

Exhaust product from gas turbine have high temperature, typically around 700° F. and higher. Components exposed to such temperatures require high heat resistance characteristics.

SUMMARY

The present disclosure may comprise one or more of the following features and combinations thereof.

According to an aspect of the present disclosure a turbomachinery assembly defining a primary flow path may include a retention member having a dovetail receiver formed therein; and a flow path member formed of ceramic matrix composite materials and arranged to contact fluids within the primary flow path. The flow path member may include a dovetail assembly configured for engagement within the dovetail receiver to retain the flow path member for contact with fluids within the primary flow path, the dovetail assembly including a contoured root having serpentine curvature and a dovetail connector engaging the contoured root with at least one engagement surface formed complimentary to the contoured root.

In some embodiments, the dovetail connector may include a pair of dovetail blocks each having an engagement surface formed complimentary to the contoured root.

In some embodiments, the flow path member may include a body for contact with fluids within the primary flow path and the contoured root extends from the body for connection with the retention member.

In some embodiments, the contoured root may form a flange extending radially about the rotational axis with serpentine curvature.

In some embodiments, the dovetail connector may be secured to the contoured root by at least one pin. In some embodiments, the at least one pin may penetrate through the dovetail assembly to secure the dovetail connector about the contoured root. In some embodiments, the at least one pin may penetrate through the contoured root. In some embodiments, the at least one pin may form a bi-cast portion of the dovetail assembly.

In some embodiments, the radius of curvature of at least a portion of the contoured root may be within a range of about 0.05 inches to about 0.5 inches. In some embodiments, the contoured root may be enclosed within the dovetail connector.

In some embodiments, the flow path member may include a number of plies that extend to form at least a portion of the flow path member arranged to contact with the fluids within the primary flow path and extend to form at least a portion of the contoured root. In some embodiments, the flow path member may include a number of plies that extend to form at least a portion of a platform arranged to contact fluids within the primary flow path and extend to form at least a portion of the contoured root. In some embodiments, the number of plies may extend to form the at least a portion of the contoured root with curvature corresponding to the serpentine curvature of the contoured root.

In some embodiments, the dovetail blocks form a platform arranged to contact fluids within the primary flow path.

In some embodiments, the dovetail blocks may be secured to the contoured root by at least one of brazing, diffusion brazing, and diffusion bonding.

In some embodiments, the turbomachinery assembly may further include a power train including a compressor section for compressing air, a combustion section for combusting compressed air mixed with fuel, and a turbine section for expanding combustion products to generate rotational force, the power train defining a rotational axis, the power train defining the primary flow path along the compressor section, combustion section, and turbine section.

According to another embodiment of the present disclosure, a flow path member of a gas turbine engine having a primary flow path, the flow path member may include a body formed of ceramic matrix composite materials and arranged to contact fluids within the primary flow path; and a dovetail assembly extending from the body and configured for engagement within a dovetail receiver of the gas turbine engine to retain the body of the flow path member within the primary flow path. The dovetail assembly may include a contoured root extending from the body with serpentine curvature and a dovetail connector engaging the contoured root with at least one engagement surface formed complimentary to the contoured root.

In some embodiments, the dovetail connector may include a pair of dovetail blocks each having an engagement surface formed complimentary to the contoured root.

In some embodiments, the contoured root may form a flange extending radially about a rotational axis of the gas turbine engine with serpentine curvature.

In some embodiments, the dovetail connector may be secured to the contoured root by at least one pin. In some embodiments, the at least one pin may penetrate through the dovetail assembly to secure the dovetail connector about the contoured root. In some embodiments, the at least one pin may penetrate through the contoured root. In some embodiments, the at least one pin may form a bi-cast portion of the dovetail assembly.

In some embodiments, the radius of curvature of at least a portion of the contoured root may be within a range of about 0.05 inches to about 0.5 inches.

In some embodiments, the flow path member may include a number of plies that extend to form at least a portion of the body arranged to contact fluids within the primary flow path and extend to form at least a portion of the contoured root. In some embodiments, the flow path member may include a number of plies that extend to form at least a portion of a platform arranged to contact fluids within the primary flow path and extend to form at least a portion of the contoured root. In some embodiments, the number of plies may extend to form the at least a portion of the contoured root with curvature corresponding to the serpentine curvature of the contoured root.

In some embodiments, the dovetail blocks form a platform arranged to contact fluids within the primary flow path.

In some embodiments, the dovetail blocks may be secured to the contoured root by at least one of brazing, diffusion brazing, and diffusion bonding.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
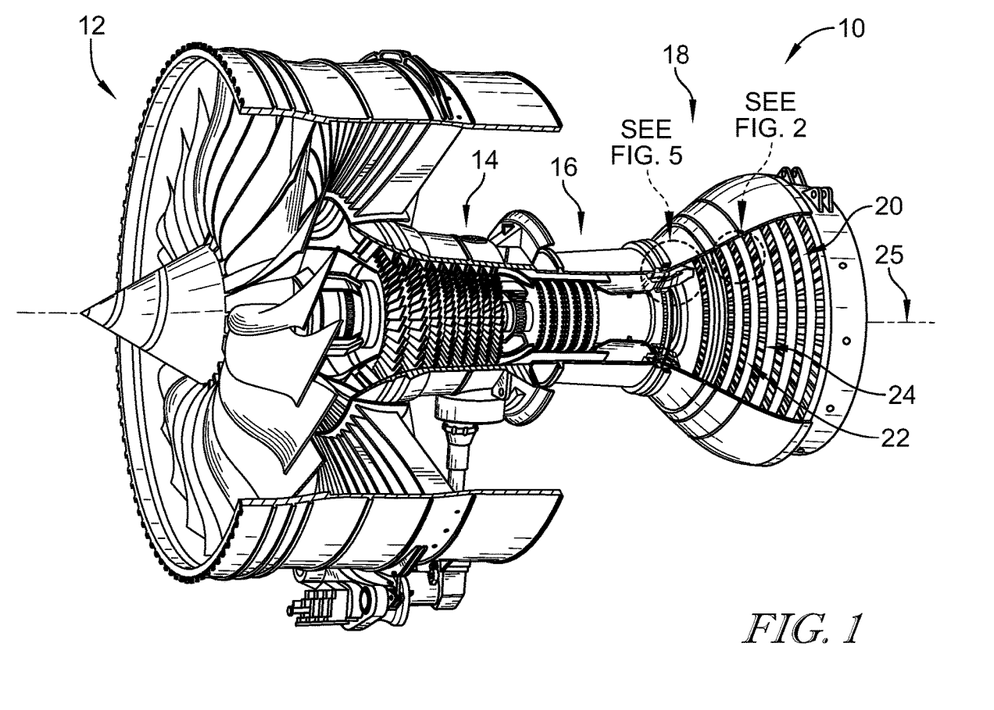
FIG. 1 is a perspective view of a gas turbine engine according to the present disclosure with a portion cut away showing that the engine includes a fan, a compressor, a combustor, and a turbine.

An illustrative gas turbine engine 10 with a portion cut away is shown in FIG. 1 to illustrate that the gas turbine engine 10 includes a fan 12, a compressor 14, a combustor 16, and a turbine 18. The fan 12 is driven by the turbine 18 and provides thrust for driving a load (not shown), for example propulsion of an aircraft. The compressor 14 compresses and delivers air to the combustor 16. The combustor 16 mixes fuel with the compressed air from the compressor 14 and combusts the mixture. The hot, high-pressure exhaust products of the combustion reaction in the combustor 16 are directed into the turbine 18 to cause a wheel assembly 20 of the turbine 18 to rotate about an axis 25 to drive the compressor 14 and the fan 12. The illustrative embodiment of FIG. 1 provides a turbofan configuration including fan 12, but in some embodiments the gas turbine engine 10 may exclude the fan 12 and/or be configured as a turboprop, turbojet, and/or to have any other suitable configuration.

Figure 2:
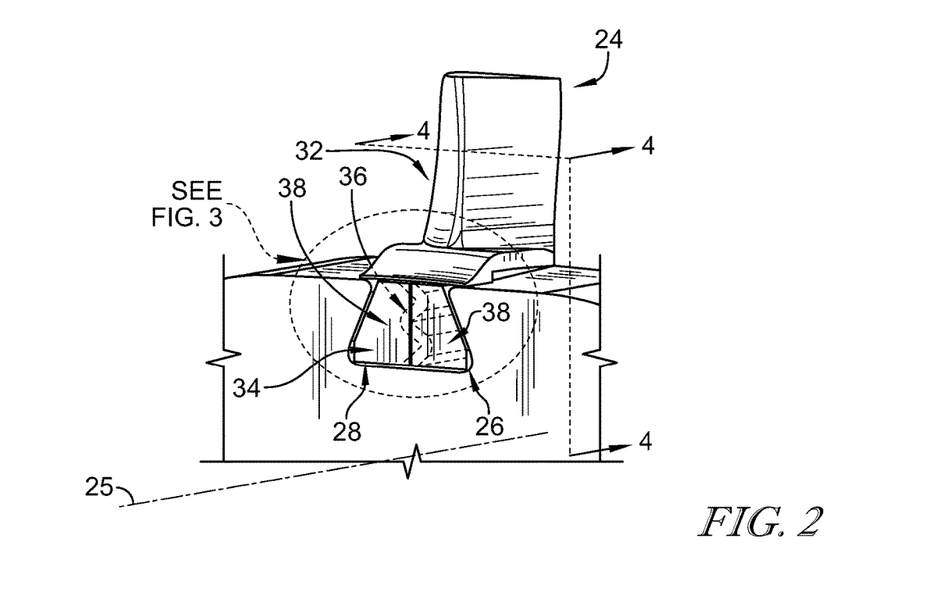
FIG. 2 is a perspective view of a portion of the turbine of the gas turbine engine shown in FIG. 1 showing that the turbine includes a wheel assembly having a rotor and blades extending radially from the rotor for contact with exhaust products flowing through a primary flow path of the gas turbine engine and showing that the blade is secured with the rotor by a dovetail connection formed between a dovetail receiver of the rotor and a dovetail assembly of the blade.
Figure 5:
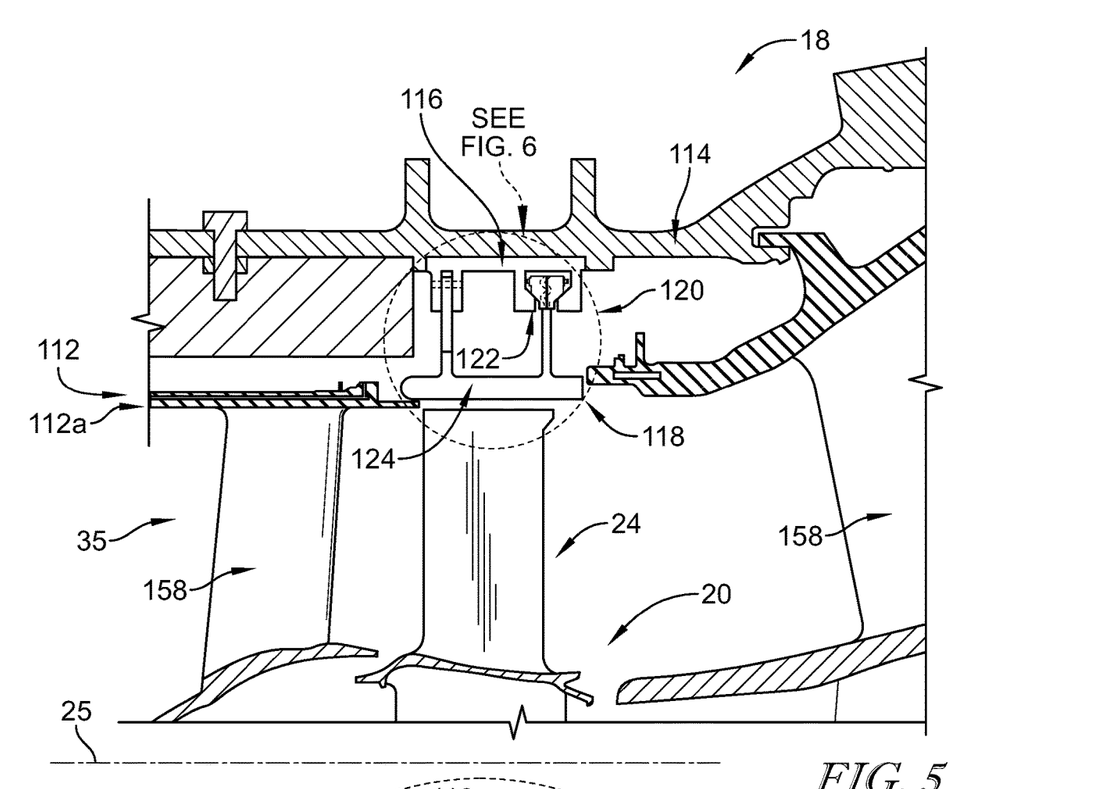
FIG. 5 is a cross-sectional view of a portion of the turbine shown in FIG. 1 taken along the axis 25 showing that the turbine includes a turbine shroud positioned radially outward of the blades and having a carrier and a blade track secured with the carrier by a dovetail connection and arranged for contact with exhaust products flowing through the primary flow path of the gas turbine engine.

As shown in the illustrative embodiment of FIG. 2, a closer view of a portion of turbine 18 shows that the wheel assembly 20 includes a rotor 22 and blades 24 extending radially from the rotor 22 for receiving the exhaust products flowing through a primary flow path 35 (as best shown in FIG. 5). Expansion of the exhaust products across the blades 24 drives rotation of the rotor 22 about the axis 25. The blades 24 each illustratively form a dovetail connection with the rotor 22.

As shown in the illustrative embodiment of FIG. 2, the rotor 22 includes a dovetail receiver 26 defined therein for each blade 24. Each dovetail receiver 26 is illustratively formed to include a slot 28 defined by opposing engagement surfaces 30 angled along the radial direction and facing at least partially radially inward. The dovetail receiver 26 receives the blade 24 to form a dovetail connection.

As shown in FIG. 2, each blade 24 illustratively includes a body 32 and a dovetail assembly 34 for connection with the rotor 22. The dovetail assembly 34 illustratively provides the tail (positive) portion of the dovetail connection between each blade 24 and the rotor 22. The dovetail assembly 34 is illustratively arranged within the slot 28 of the dovetail receiver 26 to engage with the engagement surfaces 30 to connect each blade 24 with the rotor 22.

Figure 3:
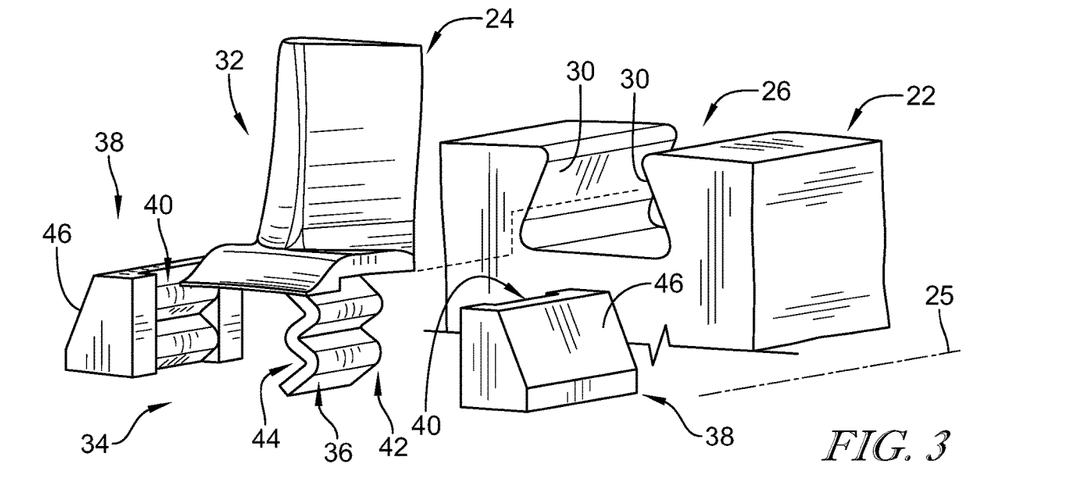
FIG. 3 is an exploded perspective view of portions of the blade and rotor of FIG. 2 showing that the dovetail assembly of the blade includes a contoured root having serpentine curvature and dovetail blocks having inner surfaces shaped complimentary to the contoured root.

As shown in the illustrative embodiment of FIG. 3, the dovetail assembly 34 of each blade 24 includes a contoured root 36 extending radially from the body 32 and dovetail blocks 38 engaged with the contoured root 36. The contoured root 36 illustratively includes serpentine curvature viewed along the axis 25. The dovetail blocks 38 engage the contoured root 36 to form the tail portion.

Figure 4:
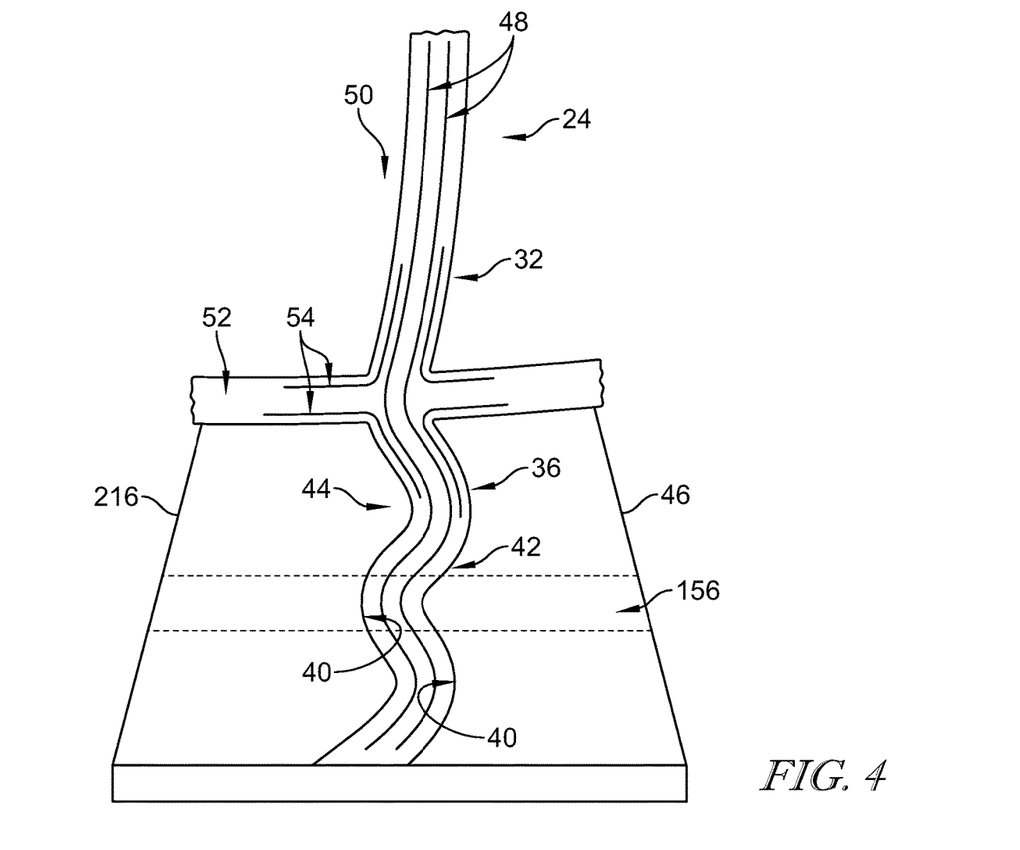
FIG. 4 is a cross-sectional view of the blade of FIGS. 2 and 3 taken along the plane 4-4 in FIG. 2 showing that the blade includes plies of substrate material extending through the contoured root to form the serpentine curvature and showing that the dovetail blocks can be secured to the contoured root by a pin.

As shown in FIG. 3, the dovetail blocks 38 each illustratively include inner surfaces 40 shaped complimentary to the contoured root 36. The inner surfaces 40 engage with opposite circumferential sides 42, 44 of the contoured root 36 to form a complimentary fit engaging the contoured root 36 substantially completely along its radial extension from the body 32 (as best shown in FIG. 4). The dovetail blocks 38 are each illustratively secured about the contoured root 36 to form the dovetail assembly 34 for engagement with the rotor 22.

As shown in FIGS. 2 and 3, the dovetail assembly 34 is received within the slot 28 of the dovetail receiver 26. Each dovetail block 38 of the dovetail assembly 34 includes a sloped surface 46 for engagement with the rotor 22 to secure the blade 24 therewith. In the illustrative embodiment, the sloped surfaces 46 illustratively face at least partially radially outward for engagement with the engagement surfaces 30 to the slot 28 of the dovetail receiver 26. The opposing wedge forces of the dovetail connection provide a support connection to orient interaction forces according to strengths of the individual components.

In the illustrative embodiment as shown in FIG. 4, the dovetail assembly 34 in cross-section shows the complimentary fit between the contoured root 36 and the engagement surfaces 40. The blade 24 is illustratively formed of ceramic matrix composite materials (CMC). In the illustrative embodiment, the blade 24 illustratively includes plies 48 that extend between the contoured root 36 and the body 32. The plies 48 illustratively extend through the contoured root 36 with serpentine curvature to form the serpentine curvature of the contoured root 36. In some embodiments, the CMC materials may be formed as laminate, weave, other suitable construction, and/or combinations thereof.

As shown in FIG. 4, the body 32 of the blade 24 illustratively includes a stem 50 having an airfoil shape and extending radially from connection with the contoured root 36 for arrangement within the primary flow path and a platform 52 extending circumferentially from the stem 50. In the illustrative embodiment, each blade 24 includes additional plies 54 forming portions of both the platform 52 and one of the stem 50 and the contoured root 36. The arrangement of the plies 48, 54 as a substrate material for applying filler creates an integral construction of the blade 24. In some embodiments, the platform 52 may be excluded, formed separately, or may be formed as a portion of the dovetail blocks 38. In embodiments having an integral CMC platform, other (e.g., metal) components would be protected from the primary flow path temperatures by the CMC material. However, without limitation, the added manufacturing complexity and cost of an integral CMC platform can be a tradeoff against parasitic cost of extra cooling flow required for a metallic platform.

The dovetail connection provides a strong connection between the blade 24 as a flow path member and the rotor 22. The body 32 and contoured root 36 of the blade 24 are illustratively formed of ceramic matrix composite (CMC) materials while the dovetail blocks 38 are illustratively formed of metallic materials, for example but without limitation, high temperature nickel and/or cobalt alloys. In some embodiments, the CMC materials may include monolithic ceramic, for example, but without limitation, silicon nitride. The dovetail connection provides a strong connection between the different materials with orientation to distribute loading appropriately for the CMC materials. In some embodiments, the dovetail blocks 38 may include CMC materials and/or any other suitable materials.

In another illustrative embodiment as shown in FIG. 5, the turbine 18 illustratively includes a turbine shroud 112 that extends around the wheel assembly 20 to encourage combustion exhaust to flow in a manner that applies force to the blades 24 to rotate the rotor 22. Combustion exhaust that passes over the blades 24 does not apply force to the blades 24 and such pass-over exhaust creates operational performance loss. The turbine shroud 112 is illustratively comprised of a plurality of turbine shroud segments 112a arranged within a casing 114 to form an annular ring as suggested in FIG. 1.

The turbine shroud 112 illustratively includes a carrier 116, a blade track 118, and a track retention assembly 120, as shown in FIG. 5. The blade track 118 extends circumferentially about the blades 24 to encourage exhaust products to expand and drive the blades 24. The track retention assembly 120 illustratively retains the blade track 118 in position for contact with exhaust products within the primary flow path. The track retention assembly 120 illustratively includes a dovetail connection formed between the blade track 118 and the carrier 116. The carrier 116 illustratively comprises a metallic material and provides a dovetail receiver 122 for supporting the blade track 118 for engagement with exhaust products within the primary flow path 35.

Figure 6:
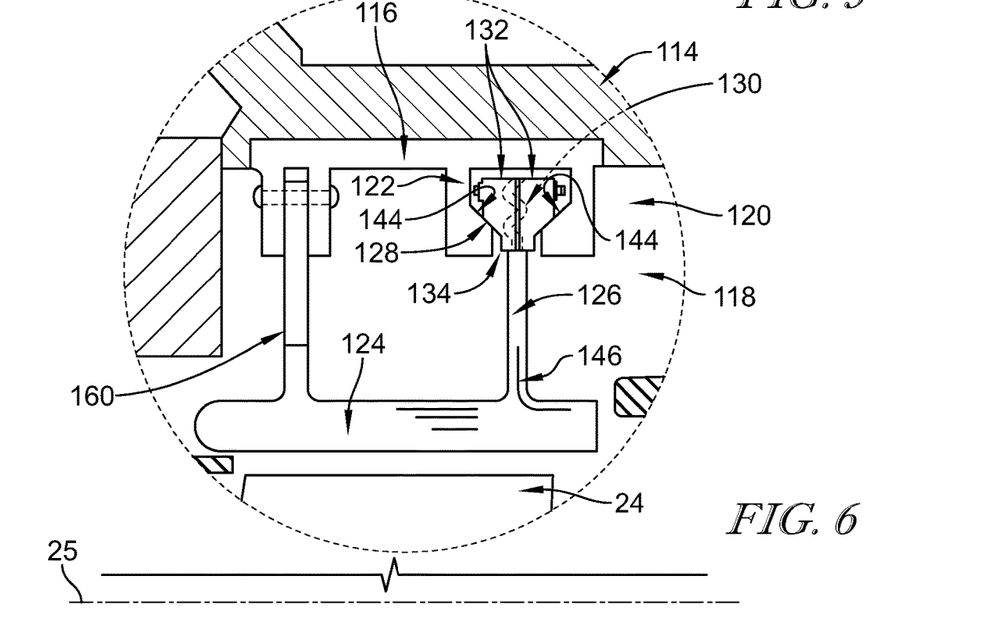
FIG. 6 is a closer view of the cross-sectional view of the portion of the turbine shown in FIG. 5 showing that the carrier is formed to include a dovetail receiver on the right side, and that the blade track includes a seal body arranged to contact exhaust products in the primary flow path, a flange extending from the seal body on the right side, and a dovetail assembly extending from the flange and positioned within dovetail receiver to support the blade track.

As shown in FIG. 6, the blade track 118 illustratively includes a seal body 124, a flange 126 extending radially from the seal body 124, and a dovetail assembly 128 extending from the flange 126 and received within the dovetail receiver 122 to couple the blade track 118 with the carrier 116. The dovetail assembly 124 illustratively includes a contoured root 130 that extends radially from the flange 126 with serpentine curvature and dovetail blocks 132 engaged with the contoured root 130. The dovetail assembly 124 is arranged within a slot 134 of the dovetail receiver 122 to form the dovetail connection to support the blade track 118 for contact with exhaust products within the primary flow path 35.

Figure 7:
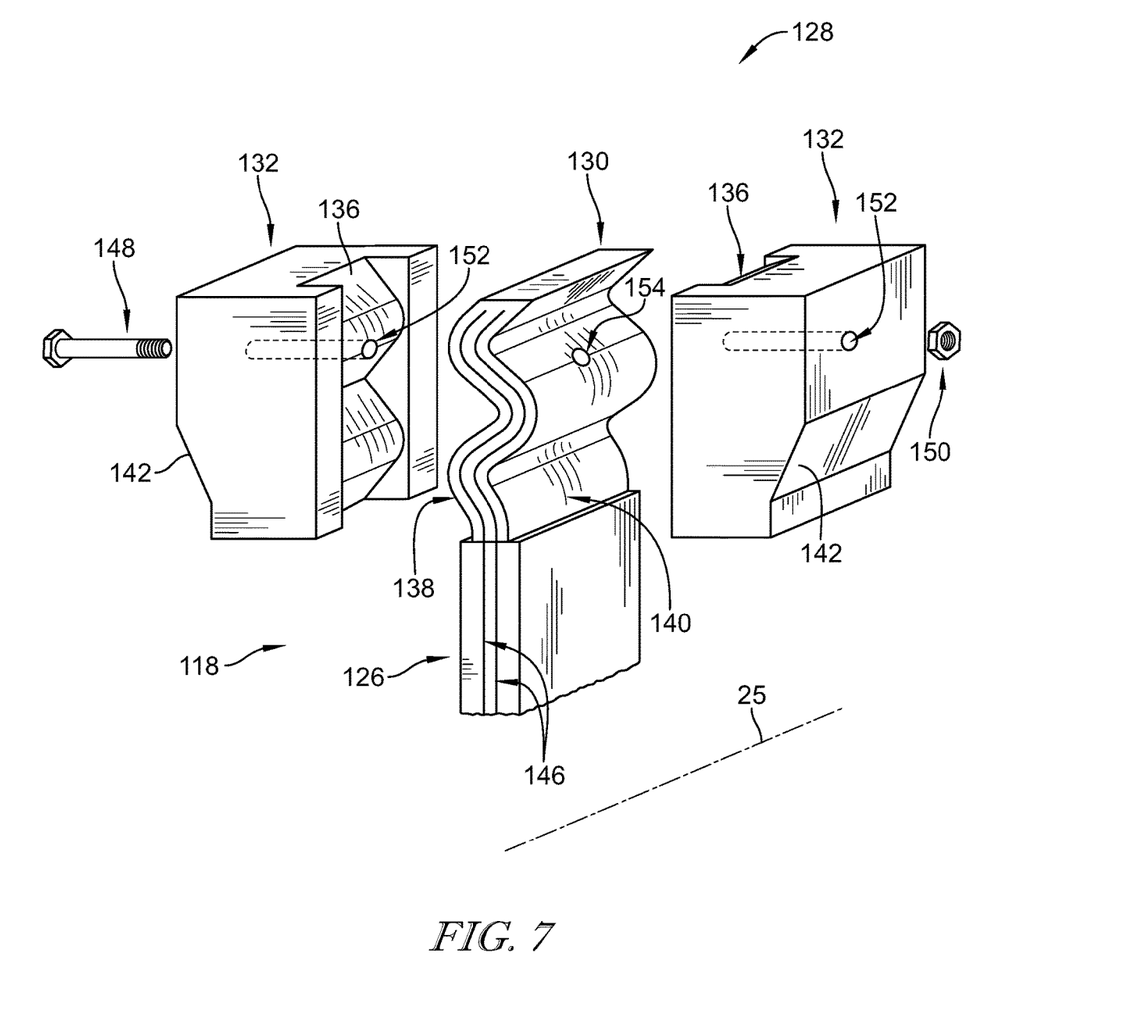
FIG. 7 is an exploded perspective view of the dovetail assembly of FIG. 6 showing that the dovetail assembly includes a contoured root extending from the flange with serpentine curvature and dovetail blocks having inner surfaces complimentary to the contoured root, and showing that the dovetail blocks can be secured with the contoured root by a pin

As shown in FIG. 6, the contoured root 130 illustratively includes serpentine curvature when viewed circumferentially with respect to the axis 25. The dovetail blocks 132 illustratively engage the contoured root 130 to form a tail portion of the dovetail connection. As best shown in FIG. 7, the dovetail blocks 132 each illustratively include surfaces 136 shaped complimentary to the contoured root 126. The surfaces 136 each illustratively engage with opposite circumferential sides 138, 140 of the contoured root 130 to form a complimentary fit engaging the contoured root 130 substantially completely along its radial extension from the flange 126 (as suggested in FIGS. 6 and 7). The dovetail blocks 132 are each illustratively secured about the contoured root 130 to form the dovetail assembly 128 for engagement with the dovetail receiver 122.

As shown in FIG. 7, the dovetail blocks 132 illustratively include engagement surfaces 142 for engagement with dovetail surfaces 144 of the dovetail receiver 122 (as shown in FIG. 6). The dovetail surfaces 144 of the dovetail reciever 122 are each illustratively angled along the radial direction and face at least partially radially outward. The engagement surfaces 142 of the dovetail blocks 132 are each illustratively angled along the radial direction and facing at least partially radially inward complimentary to the dovetail surfaces 144. Engagement between the engagement surfaces 142 and the dovetail surfaces 144 forms the dovetail connection. The opposing wedge forces of the dovetail connection provide a support connection with forces oriented according to strengths of the individual components.

In the illustrative embodiment as shown in FIG. 7, the dovetail assembly 34 is formed to include a complimentary fit between the countered root 130 and the surfaces 136 of the dovetail blocks 132. The blade track 118 is illustratively formed of ceramic matrix composite (CMC) materials. In the illustrative embodiment, the blade track 118 illustratively includes plies 146 that extend between and form portions of each of the flange 126 and the countered root 130. The plies 146 illustratively extend through the countered root 130 with serpentine curvature to form the serpentine curvature of the countered root 130. In the illustrative embodiment, the plies 146 extend through the flange 126 to form a portion of the seal body 124. The arrangement of the plies 146 as a substrate material for applying filler creates an integral construction of the blade track 118. In some embodiments, the CMC materials may be formed as laminate, weave, other suitable construction, and/or combinations thereof.

The dovetail connection provides a strong connection between the blade track 118 as a flow path member and the carrier 116. The contoured root 130 and the flange 126 of the blade track 118 are illustratively formed of ceramic matrix composite (CMC) materials while the dovetail blocks 132 are formed of metallic materials. The dovetail connection provides a strong connection between the different materials with orientation to distribute loading appropriately for the CMC materials.

As shown in FIG. 7, the dovetail assembly 128 illustratively includes a fastening system, illustratively embodied as a bolt 148 and nut 150 for securing the dovetail blocks 132 with the contoured root 130. The bolt 148 illustratively penetrates through holes 152, 154 in each of the dovetail blocks 132 and the contoured root 130 for threaded connection with the nut 150. In some embodiments, the holes 152 may be arranged beyond the radial and/or axial extent of the contoured root 130 such that penetration of the bolt 148 through the contoured root 130 is unnecessary as suggested in FIG. 6, and the hole 154 can be omitted. In some embodiments, the dovetail assembly may include any number and/or arrangement of fasteners through respective holes.

Returning to FIG. 6, the blade track 118 illustratively includes another flange 160 extending from the seal body 124 for connection with the carrier 116. The flange 160 is illustratively pinned to the carrier 116 but in some embodiments, may be connected with the carrier 116 by any suitable arrangement. In some embodiments, the blade track 118 may include any number and/or arrangement of connections with the carrier in addition to the dovetail connection.

Figure 8:
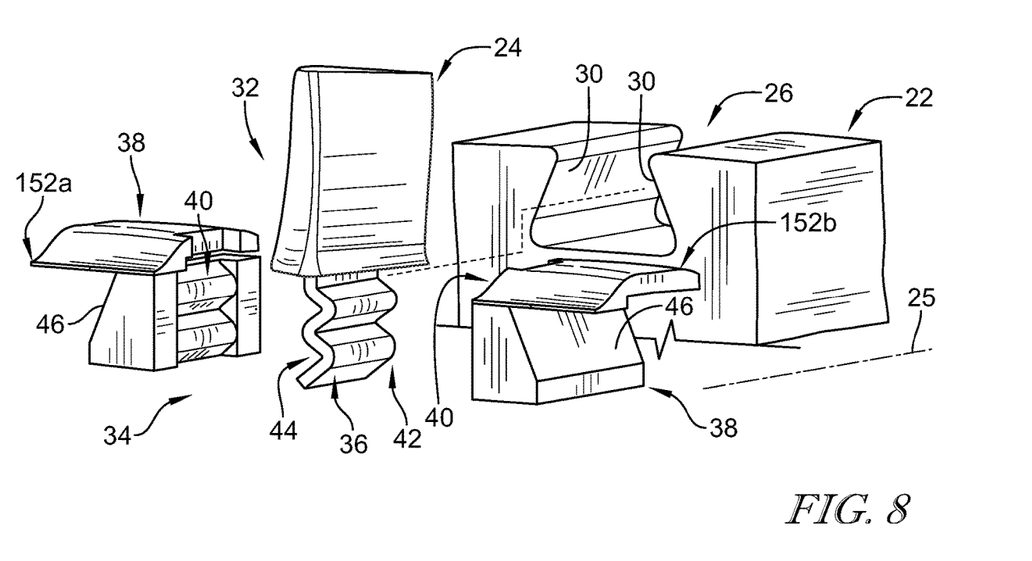
FIG. 8 is an exploded perspective view of portions of the blade and rotor of FIG. 2 having another arrangement showing that the dovetail blocks include platform portions for collectively forming a platform for positioning in the primary flow path.

In another illustrative embodiment as shown in FIG. 8, a platform 152a, 152b is formed of component platform parts 152a, 152b. The platform parts 152a, 152b are each formed as part of a respective dovetail block 38. The platform 152a, 152b is generally arranged in the same position as the platform 52 discussed above such that each platform part 152a, 152b is in close proximity with the body 32 of the blade 24. This arrangement permits the platform 152a, 152b to be formed as a portion of the dovetail blocks 38 and can be formed of the same materials and/or methods, for example but without limitation, the dovetail blocks 38 and platform 152a, 152b can be formed of metallics while the blade 24 is includes CMC materials. In the illustrative embodiment, the platform 152a, 152b is integral with the dovetail blocks 38, but in some embodiments, may be secured thereto, for example but without limitation, by fasteners.

In the illustrative embodiment as shown in FIG. 6, the arrangement allows some axial movement at the attachment of the dovetail blocks 130 with the contoured root 130. This type of attachment accommodates relative thermal growth between the carrier 116 and blade track 118. This present disclosure includes a dovetail attachment that can carry substantial radial load. By placing the dovetail attachment close to the center of pressure loading on the blade track seal segment and the other attachment(s) further from the center of pressure, the dovetail attachment can be used to carry the bulk of the pressure load, enabling a weaker attachment which provides the ability for relative motion, minimizing stresses, wear, etc.

The present disclosure includes dovetail blocks 38, 132 illustratively shown as a pair of dovetail blocks. In some embodiments, the dovetail blocks 38, 132 may be integral by fastening (e.g., bolt, split or spiral rolled pin), joining, bi-casting, any other suitable integration, and/or combinations thereof. In embodiments in which the dovetail blocks 38, 132 are formed of CMC materials, they may be joined by slurry melt infiltration, ceramic brazing and/or welding, other suitable joining methods, and/or combinations thereof. As shown in FIG. 4, an optional bi-cast portion is embodied as a pin 156 penetrating through each of the dovetail blocks 38 and the contoured root 36. The pin 156 is illustratively cast in place after engaging the dovetail blocks 38 with the contoured root 36 to secure the dovetail assembly 34. In some embodiments, the bi-cast pin 156 may be used as the fastening system of the dovetail assembly 128. In some embodiments, the dovetail blocks 38, 138 may be themselves bi-cast about the respective contoured root 36, 130 and may include the bi-cast pin 156. Bi-cast portions can provide a zero-clearance assembly. In some embodiments, the dovetail assembly 34, 128 may include any number of bi-cast pins 156. In some embodiments, the dovetail blocks 38, 132 may be secured in place by the wedge geometry of the dovetail connection without fastening, being formed integrally, and/or joining.

The present disclosure includes dovetail connections between CMC materials and metallic materials. In some embodiments, the dovetail connections may connect components of any material construction including the same materials. In the illustrative embodiment, ceramic matrix composite materials include silicon carbide fibers and silicon carbide matrix. In some embodiments, CMC materials may include oxides of aluminum, nitrogen, MAX phase materials (e.g. $Ti_3SIC_2$, $Ti_2AlC$, etc.), and/or the like.

The present disclosure includes descriptions of contoured roots 36, 130 having serpentine and/or "zig-zag" curvature. In the illustrative embodiments, the contoured roots 36, 130 include more than one bend, and specifically three bends. In the illustrative embodiments, the radius of curvature of the bends of the serpentine curvature of the contoured roots 36, 130 is within the range of about 0.050 inches to about 0.50 inches. Complimentary curvatures illustratively fall within about the same range. In some embodiments, any suitable range of radius of curvature and/or number of bends may be used.

In the present disclosure, the bends of the serpentine curvature of the contoured roots 36, 130 provide a load transfer mechanism between the flow path member (blade 24, blade track 118) and another component (rotor 22, carrier 116). The bolt 148 and/or the bi-cast pin 156, and friction (or shear if bonded) between the dovetail blocks 38, 132 and the contoured roots 36, 130, can each provide another load transfer mechanism.

As shown in FIG. 5, the turbine 18 illustratively includes vanes 158 which may be secured to a stator by dovetail connection with pressure loading to load the dovetail pin against the engagement surfaces defining the dovetail slot. Such pressure loading may include a spring and/or resilient member. In some embodiments, the disclosed dovetail connections may be applied to any one or more of the blades 24, blade track 118, vanes 158, and/or other gas turbine engine components.

In the illustrative embodiment, as discussed above, the contoured root 30 is oriented such that the serpentine curvature of can be seen when viewed axially (as in FIG. 2) and the contoured root 136 is oriented such that the serpentine curvature of t it can be seen when viewed circumferentially (as in FIGS. 5 and 6). In some embodiments, the contoured roots 30, 130 can be oriented such that their serpentine curvature of can be seen in any number of directions and/or orientations, and may include 3-dimensional curvature.

As shown in FIG. 3, the dovetail blocks 38 illustratively extend axially past the serpentine curvature flange 36. The dovetail blocks 38 are illustratively define a gap at their interface (interface of axial ends near numeral 36 in FIG. 2) to ensure contact is between surfaces 40 and the contoured root 30 on the corresponding side 44, 42 and not directly between the dovetail blocks 38 themselves. The axial ends of the dovetail blocks can provide greater dovetail surface contact length for reducing stresses and can be used for locating components during assembly. In some embodiments, the gap may be omitted and/or filled in, for example but without limitation, by welding. In some embodiments, the dovetail blocks 38 may not to extend axially past the contoured root 30.

In some embodiments, the dovetail assembly may be formed by brazing, diffusion brazing, and/or diffusion bonding, for example but without limitation, between dovetail pieces and CMC serpentine curvature. Such arrangement can close gaps between the components, and encourage even transferring of loads instead of only transferring loads at the contact points.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbomachinery assembly defining a primary flow path comprising
   a retention member having a dovetail receiver formed therein,
   a flow path member formed of ceramic matrix composite materials and arranged to contact fluids within the primary flow path, the flow path member including a dovetail assembly configured for engagement within the dovetail receiver to retain the flow path member for contact with fluids within the primary flow path, the dovetail assembly including a contoured root having serpentine curvature and a dovetail connector engaging the contoured root with at least one engagement surface formed complimentary to the contoured root, wherein the contoured root has a substantially constant thickness.

2. The turbomachinery assembly of claim 1, wherein dovetail connector includes a pair of dovetail blocks each having an engagement surface formed complimentary to the contoured root.

3. The turbomachinery assembly of claim 1, wherein the flow path member includes a body for contact with fluids within the primary flow path and the contoured root extends from the body for connection with the retention member.

4. The turbomachinery assembly of claim 3, wherein the contoured root forms a flange extending radially about a rotational axis with serpentine curvature.

5. The turbomachinery assembly of claim 1, wherein the dovetail connector is secured to the contoured root by at least one pin.

6. The turbomachinery assembly of claim 5, wherein the at least one pin penetrates through the dovetail assembly to secure the dovetail connector about the contoured root.

7. The turbomachinery assembly of claim 6, wherein the at least one pin penetrates through the contoured root.

8. The turbomachinery assembly of claim 6, wherein the at least one pin forms a bi-cast portion of the dovetail assembly.

9. The turbomachinery assembly of claim 1, wherein the radius of curvature of at least a portion of the contoured root is within a range of 0.05 inches to 0.5 inches.

10. The turbomachinery assembly of claim 1, wherein the contoured root is enclosed within the dovetail connector.

11. The turbomachinery assembly of claim 1, wherein the flow path member includes of a number of plies that extend to form at least a portion of the flow path member arranged to contact with the fluids within the primary flow path and extend to form at least a portion of the contoured root.

12. The turbomachinery assembly of claim 1, wherein the flow path member include a number of plies that extend to form at least a portion of a platform arranged to contact fluids within the primary flow path and extend to form at least a portion of the contoured root.

13. The turbomachinery assembly of claim 12, wherein the number of plies extend to form the at least a portion of the contoured root with curvature corresponding to the serpentine curvature of the contoured root.

14. The turbomachinery assembly of claim 1, wherein the dovetail blocks form a platform arranged to contact fluids within the primary flow path.

15. The turbomachinery assembly of claim 1, further comprising a power train including a compressor section for compressing air, a combustion section for combusting compressed air mixed with fuel, and a turbine section for expanding combustion products to generate rotational force, the power train defining a rotational axis, the power train defining the primary flow path along the compressor section, combustion section, and turbine section.

16. A flow path member of a gas turbine engine having a primary flow path, the flow path member comprising
   a body formed of ceramic matrix composite materials and arranged to contact fluids within the primary flow path, and
   a dovetail assembly extending from the body and configured for engagement within a dovetail receiver of the gas turbine engine to retain the body of the flow path member within the primary flow path, wherein the dovetail assembly includes a contoured root extending from the body with serpentine curvature and a dovetail connector engaging the contoured root with at least one engagement surface formed complimentary to the contoured root, wherein the contoured root has a substantially constant thickness.

17. The flow path member of claim 16, wherein dovetail connector includes a pair of dovetail blocks each having an engagement surface formed complimentary to the contoured root.

18. The flow path member of claim 16, wherein the contoured root forms a flange extending radially about a rotational axis of the gas turbine engine with serpentine curvature.

19. The flow path member of claim 16, wherein the dovetail connector is secured to the contoured root by at least one pin.

20. The flow path member of claim 19, wherein the at least one pin penetrates through the dovetail assembly to secure the dovetail connector about the contoured root.

21. The flow path member of claim 20, wherein the at least one pin penetrates through the contoured root.

22. The flow path member of claim 20, wherein the at least one pin forms a bi-cast portion of the dovetail assembly.

23. The flow path member of claim 16, wherein the radius of curvature of at least a portion of the contoured root is within a range of 0.05 inches to 0.5 inches.

24. The flow path member of claim 16, wherein the flow path member includes a number of plies extend to form at least a portion of the body arranged to contact fluids within the primary flow path and extend to form at least a portion of the contoured root.

25. The flow path member of claim 16, wherein the flow path member includes a number of plies that extend to form at least a portion of a platform arranged to contact fluids within the primary flow path and extend to form at least a portion of the contoured root.

26. The flow path member of claim 25, wherein the number of plies extend to form the at least a portion of the contoured root with curvature corresponding to the serpentine curvature of the contoured root.

27. The flow path member of claim 16, wherein the dovetail blocks form a platform arranged to contact fluids within the primary flow path.

28. The flow path member of claim 16, wherein the dovetail blocks are secured to the contoured root by at least one of brazing, diffusion brazing, and diffusion bonding.

* * * * *